(12) United States Patent
Buchholz et al.

(10) Patent No.: US 7,834,075 B2
(45) Date of Patent: *Nov. 16, 2010

(54) FLAMEPROOFED IMPACT-STRENGTH-MODIFIED POLY(ESTER)CARBONATE COMPOSITIONS

(75) Inventors: Vera Buchholz, Köln (DE); Eckhard Wenz, Köln (DE); Thomas Eckel, Dormagen (DE); Burkhard Thuermer, Bornheim (DE); Dieter Wittmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 94 days.

This patent is subject to a terminal disclaimer.

(21) Appl. No.: 11/725,250

(22) Filed: Mar. 19, 2007

(65) Prior Publication Data

US 2007/0225412 A1 Sep. 27, 2007

(30) Foreign Application Priority Data

Mar. 22, 2006 (DE) ......................... 10 2006 012 990

(51) Int. Cl.
    *C08K 3/38* (2006.01)
(52) U.S. Cl. ................ 524/405; 524/127; 524/140; 524/141; 524/404; 524/451
(58) Field of Classification Search .............. 524/127, 524/140, 141, 404, 451, 405
    See application file for complete search history.

(56) References Cited

U.S. PATENT DOCUMENTS

| | | | |
|---|---|---|---|
| 5,472,644 A * | 12/1995 | Schubert ............... 252/609 |
| 5,693,700 A * | 12/1997 | Venkataramani et al. .... 524/405 |
| 5,849,827 A | 12/1998 | Bödiger et al. ............. 521/423 |
| 6,448,316 B1 | 9/2002 | Hirano et al. ............... 524/127 |
| 6,448,324 B1 | 9/2002 | Nodera et al. ............... 524/451 |
| 6,569,930 B1 | 5/2003 | Eckel et al. ................. 524/127 |
| 6,583,204 B1 * | 6/2003 | Eckel et al. ................. 524/127 |
| 6,737,465 B2 | 5/2004 | Seidel et al. ................ 524/451 |
| 6,784,232 B1 | 8/2004 | Zobel et al. ................ 524/117 |
| 6,828,366 B2 | 12/2004 | Seidel et al. ................ 524/127 |
| 6,894,099 B2 * | 5/2005 | Moore ........................ 524/405 |
| 2002/0077417 A1 | 6/2002 | Itagaki ......................... 525/67 |
| 2002/0115761 A1 * | 8/2002 | Eckel et al. ................. 524/136 |
| 2003/0008964 A1 | 1/2003 | Seidel et al. ................ 524/451 |
| 2003/0083419 A1 | 5/2003 | Seidel et al. ................ 524/451 |
| 2003/0105196 A1 | 6/2003 | Seidel et al. ................ 524/127 |
| 2003/0191250 A1 * | 10/2003 | Seidel et al. ................ 525/538 |
| 2004/0106731 A1 * | 6/2004 | Seidel et al. .................. 525/63 |
| 2006/0079614 A1 * | 4/2006 | Kikuchi ...................... 524/115 |
| 2006/0247356 A1 * | 11/2006 | Agarwal ..................... 524/451 |

FOREIGN PATENT DOCUMENTS

| | | |
|---|---|---|
| EP | 675 001 B1 | 6/1999 |
| JP | 8-208972 | 8/1996 |
| WO | 99/57198 | 11/1999 |

* cited by examiner

*Primary Examiner*—Peter Szekely
(74) *Attorney, Agent, or Firm*—Baker, Donelson, Bearman, Caldwell, & Berkowitz, PC

(57) ABSTRACT

A poly(ester)carbonate compositions characterized by its flame resistance and high impact strength is disclosed. The composition that contains
  branched aromatic poly(ester)carbonate, a graft polymer wherein the graft base is silicone rubber or silicone-acrylate rubber, talc, phosphorus-containing flameproofing agent, and an inorganic boron compound, and an optional anti-dripping agent
satisfies enhanced fire-protection requirements.

15 Claims, No Drawings

FLAMEPROOFED IMPACT-STRENGTH-MODIFIED POLY(ESTER)CARBONATE COMPOSITIONS

FIELD OF THE INVENTION

The invention relates to thermoplastic molding compositions and in particular to flame resistant and impact-strength-modified poly(ester)carbonate compositions.

TECHNICAL BACKGROUND OF THE INVENTION

The PC/ABS blends described in JP-A 11-199768 are made flame-retardant by the inclusion of monomeric and oligomeric phosphoric esters. The flame resistance is distinctly improved by the addition of inorganic filler such as talc. However, the reduction in the phosphate content that may be accomplished by such addition while retaining flame resistance, is insufficient to obtain the melt viscosities that are necessary for extrusion applications. Furthermore, the inorganic filler generally has an adverse effect on the mechanical properties, in particular on the toughness of the polycarbonate blend.

U.S. Pat. No. 5,849,827 and WO 99/07782 describe PC/ABS molding compositions that have been made flame-retardant with resorcinol-based or bisphenol-A-based oligophosphate, the burning-times being distinctly reduced by addition of nanoscale inorganic materials in low concentrations. Lacking in melt stability these compositions are unsuitable for extrusion applications.

WO 99/57198 describes PC/ABS molding compositions that have been made flame-retardant with a resorcinol-derived oligophosphate and that are distinguished by a very low Teflon content of only 0.1 wt. %, corresponding to a fluorine content of 0.076%. Linear and branched polycarbonates with a high molecular weight (31,000 g/mol or 32,000 g/mol) find application in the molding compositions. While their rheological properties make them extrudable these compositions exhibit poor ESC behavior and inferior thermal stability, particularly in the instances where sufficient flameproofing agent is incorporated to achieve a sufficient flame resistance and applications entailing thin wall thicknesses.

US 2002/0077417 A1 disclosed flame-retardant polycarbonate resin compositions consisting of branched polycarbonate, a silicone/acrylate composite graft polymer, oligomeric phosphoric ester, polytetrafluoroethylene and, optionally, talc. Oligomeric phosphoric esters of the BDP type are not disclosed.

WO 02/100948 A1 discloses thermoplastic molding compositions containing branched polycarbonate, graft polymer, talc with a mean particle size below 1000 nm and optionally, oligophosphates, vinyl copolymers and anti-dripping agents. WO 01/48074 A1 discloses thermoplastic molding compositions containing branched polycarbonate, graft polymer, talc having a special purity and optionally, oligophosphates, vinyl copolymers and anti-dripping agents.

EP 0 675 001 A1 discloses compositions containing a thermoplastic resin (such as polycarbonate, for example) and water-eliminating compounds, (e.g. zinc borate) wherein phosphorus-containing flameproofing agents, talc, acrylonitrile-butadiene-styrene copolymer (ABS) and styrene-acrylonitrile copolymer (SAN) may optionally be included as further components. These resin compositions are suitable for marking by laser.

SUMMARY OF THE INVENTION

A poly(ester)carbonate compositions characterized by its flame resistance and high impact strength is disclosed. The composition that contains branched aromatic poly(ester)carbonate, a graft polymer wherein graft base is silicone rubber or silicone-acrylate rubber, talc, phosphorus-containing flameproofing agent, and an inorganic boron compound, and an optional anti-dripping agent satisfies enhanced fire-protection requirements.

DETAILED DESCRIPTION OF THE INVENTION

The object of the present invention was to provide a chlorine- and bromine-free molding composition which both meets particularly high requirements in terms of flame resistance, such as the requirements of materials in American rail vehicles (Docket 90 A), and may be processed extrusion owing to its high melt stability. In particular, the molding composition according to Docket 90 A must not exhibit any burning drips in ASTM E 162 and must have a flame spread index Is of less than 35 and a low smoke density (Ds 1.5 min<100 and Ds 4 min<200) according to ASTM E 662. At the same time, the molding compositions should have a tensile modulus of at least 3500 N/mm² in order to ensure adequate mechanical strength.

Surprisingly, it has been found that compositions containing

A) 40-95 parts by weight, preferably 60-85 parts by weight, particularly preferably 65-78 parts by weight, of branched aromatic polycarbonate and/or branched aromatic polyester carbonate, B) 1-25 parts by weight, preferably 2-9 parts by weight, particularly preferably 4-8 parts by weight, quite particularly preferably 4.7-6.6 parts by weight, of a graft polymer including one or more graft bases selected from the group consisting of silicone rubber and silicone-acrylate rubber, C) 9-18 parts by weight, preferably 10-15 parts by weight, particularly preferably 10-12 parts by weight, of talc, D) 0.4-20 parts by weight, preferably 6-17 parts by weight, particularly preferably 8-12 parts by weight, of phosphorus-containing flameproofing agents, E) 0.5-20 parts by weight, preferably 1-10 parts by weight, particularly preferably 1-6 parts by weight, quite particularly preferably 2-4 parts by weight, of one or more inorganic boron compounds, F) 0-3 parts by weight, preferably 0.01-1 parts by weight, particularly preferably 0.1-0.6 parts by weight, of anti-dripping agents, where all the parts-by-weight data in the present application are normalized in such a way that the sum of the parts by weight of all the components in the composition is 100, have the desired range of properties.

Component A

Branched aromatic polycarbonates and/or branched aromatic polyester carbonates suitable in accordance with the invention are known and may be produced by known processes (on the production of aromatic polycarbonates, see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; on the production of aromatic polyester carbonates, see, for example, DE-A 3 007 934).

The production of aromatic poly(ester) carbonates is undertaken, for example, by conversion of aromatic dihydroxy compounds with carbonic acid halides, preferentially phosgene, and/or with aromatic dicarboxylic acid dihalides, preferentially benzenedicarboxylic acid dihalides, by the interphase process, optionally using chain stoppers, for example monophenols, and using trifunctional or tetrafunctional phenolic branching agents that may also include amine functionalities by way of active functional groups, the branching coming about in this case by virtue of amide linkages. Suitable as branching agents include triphenols or tetraphenols, preferably phenolic branching agents having at least three functional groups with graduated reactivity that are suitable for a condensation reaction. Also suitable is 1,1,1-tris(p-hydroxyphenyl)ethane.

Isatin biscresol is particularly preferred.

The branching agents are employed in a quantity from 0.01 mol. % to 5 mol. %, preferably from 0.02 mol. % to 2 mol. %, in particular from 0.05 mol. % to 1 mol. %, particularly preferably from 0.1 mol. % to 0.5 mol. %, relative to the sum of aromatic dihydroxy compounds and branching agent in the poly(ester) carbonate.

Branched polycarbonates that are suitable in accordance with the invention may also be produced by the known melt-polymerization process, by conversion of aromatic dihydroxy compounds with diphenyl carbonate using the aforementioned branching agents and chain stoppers.

Preferred aromatic dihydroxy compounds for producing the branched aromatic polycarbonates and/or aromatic polyester c conform to formula (I)

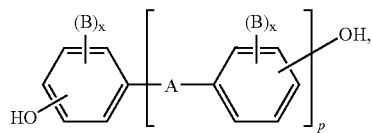

(I)

wherein

A is a single bond, $C_1$ to $C_5$ alkylene, $C_2$ to $C_5$ alkylidene, $C_5$ to $C_6$ cycloalkylidene, —O—, —SO—, —CO—, —S—, —SO_2—, $C_6$ to $C_{12}$ arylene, onto which further aromatic rings, optionally containing heteroatoms, may be condensed, or a residue of the formula (II) or (III)

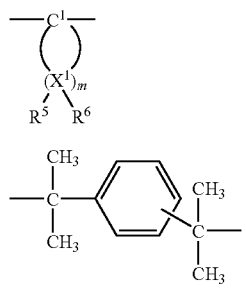

(II)

(III)

B is, in each instance, $C_1$ to $C_{12}$ alkyl, preferentially methyl, halogen, preferentially chlorine and/or bromine, x are, in each instance, independently of one another, 0, 1 or 2, p is 1 or 0, and $R^5$ and $R^6$ are individually selectable for each $X^1$ and are, independently of one another, hydrogen or $C_1$ to $C_6$ alkyl, preferentially hydrogen, methyl or ethyl, $X^1$ is carbon and m signifies an integer from 4 to 7, preferably 4 or 5, with the proviso that, on at least one atom $X^1$, $R^5$ and $R^6$ are simultaneously alkyl.

Preferred aromatic dihydroxy compounds are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl)ethers, bis(hydroxyphenyl)sulfoxides, bis(hydroxyphenyl)ketones, bis(hydroxyphenyl)sulfones and α,α-bis(hydroxyphenyl)diisopropylbenzenes and also the ring-brominated and/or ring-chlorinated derivatives thereof.

Particularly preferred aromatic dihydroxy compounds are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenylsulfide, 4,4'-dihydroxydiphenylsulfone and also the dibrominated and tetrabrominated or chlorinated derivatives thereof, such as, for example, 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particularly preferred is 2,2-bis(4-hydroxyphenyl)propane (bisphenol A).

The aromatic dihydroxy compounds may be employed individually or in the form of arbitrary mixtures. These are known or may be obtained by known processes.

Suitable chain stoppers for the production of the thermoplastic, aromatic branched polycarbonates include phenol, p-chlorophenol, p-tert-butylphenol or 2,4,6-tribromophenol, as well as long-chain alkylphenols, such as 4-(1,3-tetramethyl-butyl)phenol according to DE-A 2 842 005 or monoalkylphenol or dialkylphenols with a total of 8 to 20 C atoms in the alkyl substituents, such as 3,5-di-tert-butylphenol, p-iso-octylphenol, p-tert-octylphenol, p-dodecylphenol and 2-(3,5-dimethylheptyl)phenol and 4-(3,5-dimethylheptyl)phenol. The quantity of chain stoppers to be employed is generally 0.5 to 10 mol. %, relative to the molar amount of the aromatic dihydroxy compounds employed.

Besides the monophenols already named, the chlorocarbonic esters thereof and also the acid chlorides of aromatic monocarboxylic acids, which may optionally be substituted by $C_1$ to $C_{22}$ alkyl groups or by halogen atoms, and also aliphatic $C_2$ to $C_{22}$ monocarboxylic acid chlorides, are also suitable as chain stoppers for the production of the aromatic polyester carbonates.

The quantity of chain stoppers is 0.1 to 10 mol. %, relative, in the case of the phenolic chain stoppers, to moles of aromatic dihydroxy compounds and, in the case of monocarboxylic acid chlorides, to moles of dicarboxylic acid dichlorides.

The aromatic polyester carbonates may also include, in integrated manner, aromatic hydroxycarboxylic acids.

The proportion of carbonate structural units in the thermoplastic, aromatic polyester carbonates may vary arbitrarily. The proportion of carbonate groups is up to 100 mol. %, in particular up to 80 mol. %, particularly preferably up to 50 mol. %, relative to the sum of ester groups and carbonate groups. Both the ester portion and the carbonate portion of the aromatic polyester carbonates may be present in the polycondensate in the form of blocks or in randomly distributed manner.

The thermoplastic, aromatic branched polycarbonates and polyester carbonates may be employed on their own or in an arbitrary mixture. Preferred compositions according to the invention are free from linear polycarbonates and polyester carbonates.

The relative solution viscosities of the suitable poly(ester)carbonates is 1.20 to 1.50, preferably 1.24 to 1.40, in particular 1.24 to 1.35, measured in $CH_2Cl_2$ as solvent at 25° C. and at a concentration of 0.5 g/100 ml.

Component B

Component B comprises one or more graft polymers of
B.1 5 to 95 wt. %, preferentially 10 to 90 wt. %, of one or more vinyl monomers on
B.2 95 to 5 wt. %, preferentially 90 to 10 wt. %, of one or more graft bases selected from the group consisting of silicone rubber (B.2.1) and silicone-acrylate rubber (B.2.2), the percents being relative to the weight of B.

The graft polymers B are produced by radical polymerization, for example by emulsion polymerization, suspension polymerization, solution polymerization or melt polymerization, preferentially by emulsion polymerization or bulk polymerization.

Suitable monomers for preparing B.1 include vinyl monomers such as vinyl aromatics and/or ring-substituted vinyl aromatics (such as styrene, α-methylstyrene, p-methylstyrene, p-chlorostyrene), ($C_1$-$C_8$)-alkyl methacrylates (such as methyl methacrylate, ethyl methacrylate, 2-ethylhexyl methacrylate, allyl methacrylate), ($C_1$-$C_8$)-alkyl acrylates (such as methyl acrylate, ethyl acrylate, n-butyl acrylate, t-butyl acrylate), organic acids (such as acrylic acid, methacrylic acid), and/or vinyl cyamides (such as acrylonitrile and methacrylonitrile), and/or derivatives (such as anhydrides and imides) of unsaturated carboxylic acids (for example, maleic anhydride and N-phenyl maleimide). These vinyl monomers may be used singly or as mixtures of at least two such monomers.

Preferred monomers for preparing B.1 are at least one member selected from the group consisting of styrene, α-methylstyrene, methyl methacrylate, n-butyl acrylate and acrylonitrile. Methyl methacrylate is a particularly preferred monomer for preparing B.1.

The glass transition temperature of the graft base B.2 is lower than 10° C., preferably lower than 0° C., particularly preferably lower than −20° C. The graft base B.2 has a mean particle size ($d_{50}$ value) 0.05 to 10 μm, preferentially 0.06 to 5 μm, particularly preferably 0.08 to 1 μm.

The mean particle size $d_{50}$ is that diameter, above and below which 50 wt. %, respectively, of the particles lie; it can be determined by means of ultracentrifuge measurement (W. Scholtan, H. Lange, *Kolloid-Z. und Z. Polymere* 250 (1972), 782-796).

B.2.1 is at least one silicone rubber with graft-active sites, the method of production of which is described, for example, in U.S. Pat. No. 2,891,920, U.S. Pat. No. 3,294,725, U.S. Pat. No. 4,806,593, U.S. Pat. No. 4,877,831 EP 430 134 and U.S. Pat. No. 4,888,388 all incorporated herein by reference.

The silicone rubber according to B.2.1 is preferably produced by emulsion polymerization, wherein siloxane monomer units, cross-linking or branching agents (IV) and optionally grafting agents (V) are employed.

Dimethylsiloxane or cyclic organosiloxanes with at least 3 ring members, preferentially 3 to 6 ring members, are employed, for example, and preferably, as siloxane-monomer structural units, such as, for example, and preferably, hexamethyl cyclotrisiloxane, octamethyl cyclotetrasiloxane, decamethyl cyclopentasiloxane, dodecamethyl cyclohexasiloxane, trimethyltriphenyl cyclotrisiloxanes, tetramethyl-tetraphenyl cyclotetrasiloxanes, octaphenyl cyclotetrasiloxane.

The organosiloxane monomers may be employed singly or as mixtures of 2 or more such monomers. The silicone rubber preferably contains not less than 50 wt. %, and particularly preferably not less than 60 wt. %, organosiloxane, relative to the total weight of the silicone-rubber component.

Use is preferentially made of silane-based cross-linking agents with a functionality of 3 or 4, particularly preferably 4, by way of cross-linking or branching agents (IV). The following are preferred trimethoxymethylsilane, triethoxyphenylsilane, tetramethoxysilane, tetraethoxysilane, tetra-n-propoxysilane and tetrabutoxysilane. The cross-linking agent may be employed singly or in a mixture of two or more such agents. Tetraethoxysilane is particularly preferred.

The cross-linking agent is employed in an amount of 0.1 to 40 wt. %, relative to the total weight of the silicone-rubber component. The quantity of cross-linking agent is selected in such a way that the degree of swelling of the silicone rubber, measured in toluene, is 3 and 30, preferably 3 and 25, and particularly preferably 3 and 15. The degree of swelling is defined as the weight ratio of the quantity of toluene that is absorbed by the silicone rubber when it is saturated with toluene at 25° C. to the quantity of silicone rubber in the dried state. The ascertainment of the degree of swelling is described in detail in EP 249 964.

If the degree of swelling is less than 3, i.e. if the content of cross-linking agent is too high, the silicone rubber does not display adequate rubber-like elasticity. If the swelling index is greater than 30, the silicone rubber does not form a domain structure in the matrix polymer and therefore does not enhance impact strength; the effect would then be similar to a simple addition of polydimethylsiloxane.

Tetrafunctional cross-linking agents are preferred over trifunctional cross-linking agents, because the degree of swelling is then easier to control within the limits described above.

Suitable as grafting agents (V) are compounds capable of forming structures conforming to the following formulae:

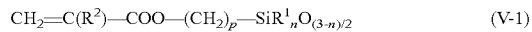

$$CH_2=C(R^2)-COO-(CH_2)_p-SiR^1_nO_{(3-n)/2} \quad \text{(V-1)}$$

$$CH_2=CH-SiR^1_nO_{(3-n)/2} \quad \text{(V-2) or}$$

$$HS-(CH_2)_p-SiR^1_nO_{(3-n)/2} \quad \text{(V-3)}$$

wherein $R^1$ denotes $C_1$-$C_4$-alkyl, preferably methyl, ethyl or propyl, or phenyl, $R^2$ denotes hydrogen or methyl, n is 0, 1 or 2 and p is a number from 1 to 6.

Acryloyloxysilanes or methacryloyloxysilanes are particularly suitable for forming the aforementioned structure (V-1), and have a high grafting efficiency. As a result, an effective formation of the graft chains is enabled, and the impact strength of the resulting resin composition is favored.

The following are preferred: β-methacryloyloxy-ethyldimethoxymethyl-silane, γ-methacryloyloxy-propylmethoxydimethyl-silane, γ-methacryloyloxy-propyldimethoxymethyl-silane, γ-methacryloyloxy-propyltrimethoxy-silane, γ-methacryloyloxy-propylethoxydiethyl-silane, γ-methacryloyloxy-propyldiethoxymethyl-silane, δ-methacryloyl-oxy-butyldiethoxymethyl-silane or mixtures thereof.

Grafting agents are used in an amount up to 20%, relative to the total weight of the silicone rubber.

The silicone rubber may be produced by emulsion polymerization, as described in U.S. Pat. No. 2,891,920 and U.S.

Pat. No. 3,294,725 incorporated herein by reference. In this case the silicone rubber is obtained in the form of an aqueous latex. For this, a mixture containing organosiloxane, cross-linking agent and optionally grafting agent is mixed, subject to shear, with water, for example by means of a homogenizer, in the presence of an emulsifier based on sulfonic acid, such as, for example, alkylbenzenesulfonic acid or alkylsulfonic acid, whereby the mixture polymerises to form silicone-rubber latex. Particularly suitable is an alkylbenzenesulfonic acid, since it acts not only as an emulsifier but also as a polymerization initiator. In this case a combination of the sulfonic acid with a metal salt of an alkylbenzenesulfonic acid or with a metal salt of an alkylsulfonic acid is favourable, because the polymer is stabilized by this means during the later graft polymerization.

After the polymerization the reaction is terminated by neutralizing the reaction mixture by adding an aqueous alkaline solution, for example an aqueous solution of sodium hydroxide, potassium hydroxide or sodium carbonate.

Also suitable as graft bases B.2 in accordance with the invention are silicone-acrylate rubbers (B.2.2). These are composite rubbers with graft-active sites containing 10-90 wt. % silicone-rubber component and 90 wt. % to 10 wt. % polyalkyl-(meth)acrylate-rubber component, the two components permeating each other in the composite rubber, so that they cannot be substantially separated from one another.

If the proportion of the silicone-rubber component in the composite rubber is too high, the finished resin compositions have inferior surface properties and impaired pigmentability. If, on the other hand, the proportion of the polyalkyl-(meth) acrylate-rubber component in the composite rubber is too high, the impact strength of the composition is adversely influenced.

Silicone-acrylate rubbers are known and are described, for example, in U.S. Pat. No. 5,807,914, EP 430 134 and U.S. Pat. No. 4,888,388 all incorporated herein by reference.

Silicone-rubber components of the silicone-acrylate rubbers according to B.2.2 are those which have already been described under B.2.1.

Suitable polyalkyl-(meth)acrylate-rubber components of the silicone-acrylate rubbers according to B.2.2 may be produced from alkyl methacrylates and/or alkyl acrylates, a cross-linking agent and a grafting agent. Exemplary and preferred alkyl methacrylates and/or alkyl acrylates in this connection are the $C_1$ to $C_8$ alkyl esters, for example methyl, ethyl, n-butyl, t-butyl, n-propyl, n-hexyl, n-octyl, n-lauryl and 2-ethylhexyl esters; halogen alkyl esters, preferentially halogen $C_1$-$C_8$-alkyl esters, such as chloroethyl acrylate, and also mixtures of these monomers. Particularly preferred is n-butyl acrylate.

Monomers with more than one polymerizable double bond may be employed as cross-linking agents for the polyalkyl-(meth)acrylate-rubber component of the silicone-acrylate rubber. Preferred examples of cross-linking monomers are esters of unsaturated monocarboxylic acids with 3 to 8 C atoms and of unsaturated monohydric alcohols with 3 to 12 C atoms, or of saturated polyols with 2 to 4 OH groups and 2 to 20 C atoms, such as ethylene glycol dimethacrylate, propylene glycol dimethacrylate, 1,3-butylene glycol dimethacrylate and 1,4-butylene glycol dimethacrylate. The cross-linking agents may be used singly or in mixtures of at least two cross-linking agents.

Exemplary and preferred grafting agents are allyl methacrylate, triallyl cyanurate, triallyl isocyanurate or mixtures thereof. Allyl methacrylate may also be employed as cross-linking agent. The grafting agents may be used singly or in mixtures of at least two grafting agents.

The quantity of cross-linking agent and grafting agent is 0.1 wt. % to 20 wt. %, relative to the total weight of the polyalkyl-(meth)acrylate-rubber component of the silicone-acrylate rubber.

The silicone-acrylate rubber is produced in a manner that in a first step the silicone rubber according to B.2.1 is produced in the form of a aqueous latex. This latex is subsequently enriched with the alkyl methacrylates and/or alkyl acrylates, cross-linking agent and grafting agent, and a polymerization is carried out. Preferred is a radically initiated emulsion polymerization, initiated for example by a peroxide initiator, an azo initiator or a redox initiator. Particularly preferred is the use of a redox initiator system, especially a sulfoxylate initiator system produced by combination of iron sulfate, disodium methylenediamine tetraacetate, rongalite and hydroperoxide.

The grafting agent which is used in the production of the silicone rubber results in the polyalkyl-(meth)acrylate-rubber component being covalently bonded to the silicone-rubber component. In the course of polymerization, the two rubber components permeate each other and form the composite rubber which after polymerization no longer separates into its constituents components.

For the production of silicone(-acrylate) graft rubbers B the monomer(s) B.1 is (are) grafted onto the rubber base B.2.

In this connection the polymerization methods that are described, for example, in EP 249 964, EP 430 134 and U.S. Pat. No. 4,888,388 may be employed.

For example, the graft polymerization is undertaken in accordance with the following polymerization method. In a single-stage or multi-stage radically initiated emulsion polymerization the desired vinyl monomers B.1 are grafted onto the graft base which is present in the form of aqueous latex. The grafting efficiency here should be as high as possible, and is preferably at least 10%. The grafting efficiency depends crucially on the grafting agent used. After the polymerization to form the silicone(-acrylate) graft rubber, the aqueous latex is passed into hot water in which metal salts, such as calcium chloride or magnesium sulfate, for example, have previously been dissolved. In the process the silicone(-acrylate) graft rubber coagulates and can subsequently be separated.

Graft polymers suitable as component B) are commercially available. Examples include Metablen® SX 005 and Metablen® SRK 200, both are products of Mitsubishi Rayon Co. Ltd.

Component C

The term 'talc' is to be understood to mean naturally occurring or synthetically produced talc.

Pure talc has the chemical composition $3MgO.4SiH_2.H_2O$ and consequently has an MgO content of 31.9 wt. %, an $SiO_2$ content of 63.4 wt. % and a content of chemically bound water of 4.8 wt. %; it is a silicate with a layered structure.

Naturally occurring talc materials generally do not have the ideal composition specified above, since they are contaminated as a result of partial replacement of the magnesium by other elements, by partial replacement of silicon, by, for example, aluminium, and/or as a result of intergrowths with other minerals such as, for example, dolomite, magnesite and chlorite.

The special grades of talc in the sense according to the invention are distinguished by a particularly high purity, characterised by an MgO content from 28 wt. % to 35 wt. %, preferably 30 wt. % to 33 wt. %, particularly preferably 30.5 wt. % to 32 wt. %, and an $SiO_2$ content from 55 wt. % to 65 wt. %, preferably 58 wt. % to 64 wt. %, particularly preferably 60 wt. % to 62.5 wt. %. Preferred types of talc are distinguished furthermore by an $Al_2O_3$ content of less than 5 wt. %, particularly preferably less than 1 wt. %, in particular less than 0.7 wt. %.

A commercially available type of talc that conforms to this definition is, for example, Luzenac® A3 produced by Luzenac Naintsch Mineralwerke GmbH (Graz, Austria).

Talc types not in the sense according to the invention are, for example, Luzenac SE-Standard, Luzenac SE-Super, Luzenac SE-Micro and also Luzenac ST 10, 15, 20, 30 and 60, all of which are marketed by Luzenac Naintsch Mineralwerke GmbH.

Advantageous, in particular, is talc having mean particle size ($d_{50}$) of 0.1 to 20 μm, preferably 0.2 to 10 μm, particularly preferably 1.1 to 5 μm, quite particularly preferably 1.15 to 2.5 μm.

The talc may be surface-treated, for example silanized, in order to improve compatibility with the polymer. With regard to the processing and production of the molding compositions, the use of compacted talc is also advantageous.

Component D

Suitable phosphorus-containing flameproofing agent (D) is at least one member selected from the groups consisting of monomeric and oligomeric phosphoric and phosphonic esters, phosphonate amines and phosphazenes. Other halogen-free phosphorus compounds, may also be employed singly or in combination with other halogen-free phosphorus compounds.

Preferred monomeric and oligomeric phosphoric and phosphonic esters conform to formula (VIII)

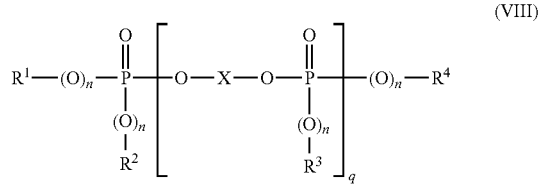

(VIII)

wherein $R^1$, $R^2$, $R^3$ and $R^4$ independently of one another, denote $C_1$ to $C_8$ alkyl, $C_5$ to $C_6$ cycloalkyl, $C_6$ to $C_{20}$ aryl or $C_7$ to $C_{12}$ aralkyl, optionally substituted by halogen or alkyl, preferably $C_1$ to $C_4$ alkyl, and/or halogen, preferably chlorine, bromine, n independently of one another denote 0 or 1, q is 0 to 30 and X denotes an aromatic residue with 6 to 30 C atoms, or a linear or branched aliphatic residue with 2 to 30 C atoms, optionally OH-substituted optionally including up to 8 ether linkages.

$R^1$, $R^2$, $R^3$ and $R^4$ preferably and independently of one another denote $C_1$ to $C_4$ alkyl, phenyl, naphthyl or phenyl-$C_1$-$C_4$-alkyl. The aromatic groups $R^1$, $R^2$, $R^3$ and $R^4$ may, in turn, be substituted with halogen groups and/or alkyl groups, preferably chlorine, bromine and/or $C_1$ to $C_4$ alkyl. Particularly preferred aryl groups are cresyl, phenyl, xylenyl, propylphenyl and butylphenyl, as well as the corresponding brominated and chlorinated derivatives thereof.

X in formula (VIII) preferably signifies a single-ring or multi-ring aromatic residue with 6 to 30 C atoms. The residue is preferably derived from aromatic dihydroxy compounds of formula (I).

n in formula (VIII) may be, independently of one another, 0 or 1; n is preferentially equal to 1.

q denotes values from 0 to 30, preferably 0.3 to 20, particularly preferably 0.5 to 10, in particular 0.5 to 6, quite particularly preferably 1.1 to 1.6.

X stands in particularly preferred manner for any of

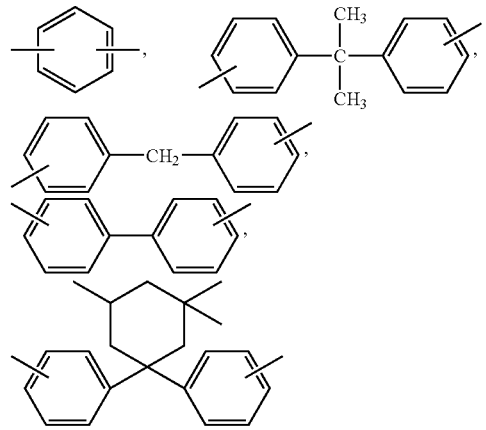

or the chlorinated or brominated derivatives thereof; in particular, X is derived from resorcinol, hydroquinone, bisphenol A or diphenylphenol. In particularly preferred manner X is derived from bisphenol A.

Mixtures of various phosphates may also be employed by way of component D according to the invention.

Phosphorus compounds of the formula (VIII) are, in particular, tributyl phosphate, triphenyl phosphate, tricresyl phosphate, diphenylcresyl phosphate, diphenyloctyl phosphate, diphenyl-2-ethylcresyl phosphate, tri(isopropylphenyl)phosphate, resorcinol-bridged diphosphate and bisphenol-A-bridged diphosphate. The use of oligomeric phosphoric esters of the formula (VIII) that are derived from bisphenol A is particularly preferred.

The phosphorus compounds according to component D are known (cf., for example, EP-A 0 363 608, EP-A 0 640 655) or may be produced in analogous manner by known methods (e.g. *Ullmanns Enzyklopadie der technischen Chemie*, Vol. 18, p 301 ff. 1979; Houben-Weyl, *Methoden der organischen Chemie*, Vol. 12/1, p 43; Beilstein, Vol. 6, p 177).

The mean q-values may be determined by the composition of the phosphate mixture (molecular-weight distribution) being determined by means of suitable methods (gas chromatography (GC), high-pressure liquid chromatography (HPLC), gel permeation chromatography (GPC)), and by the mean values of q being calculated therefrom.

Furthermore, phosphonate amines and phosphazenes, such as are described in WO 00/00541 and WO 01/18105, may be employed as flameproofing agents.

The flameproofing agents may be employed singly or in an arbitrary mixture with one another or in a mixture with other flameproofing agents.

Component E

Component E is an inorganic boron compound with elements of the 6th Main Group of the Periodic Table, preferably with oxygen. Preferred oxygen-containing boron compounds are metal salts of the borates, in which case the oxygen-containing boron compound may be present as orthoborate, metaborate, hydroxoborate or polyborate. Metals of the 1st to 5th Main Groups or of the 1 st to 8th Subgroups of the Periodic Table, preferably metals of the 1st and 2nd Main Groups or of the 1st and 2nd Subgroups of the Periodic Table, act as counter ions of the borates; for example and preferably, compounds such as $Li_3[BO_3]$, $Li[BO_2]$, $Li[B(OH)_4]$, $Na_3[B_3O_6]$, $Na_2B_4O_7 \cdot 4H_2O$, $Na_2B_4O_7 \cdot 10H_2O$, $NaCaB_5O_9 \cdot 6H_2O$, $K_3[B_3O_6]$, $KB_5O_8 \cdot 4H_2O$, $Mg_3[BO_3]_2$, $Ca[BO_3]_2$, $Ca[BO_2]_2$, $CaB_4O_7 \cdot 4H_2O$, $Ca_2B_6O_{11} \cdot 5H_2O$, $Ca_2B_6O_{11} \cdot 7H_2O$, $Ca_4B_{10}O_{19} \cdot 7H_2O$, $Ca_5B_{12}O_{23} \cdot 9H_2O$, $Sr[BO_2]_2$, $Ba_3[B_3O_6]_2$, $Cu_3[BO_3]_2$, $Zn_3[BO_3]_2$, $Na_2B_4O_7 \cdot 5H_2O$, $Na_2B_8O_{13} \cdot 4H_2O$, $BaB_2O_4 \cdot H_2O$, $ZnB_2O_4 \cdot 2H_2O$, $Zn_2B_4O_8 \cdot 3H_2O$, $Zn_2B_6O_{11} \cdot 7H_2O$, $Zn_2B_6O_{11} \cdot 9H_2O$, $Zn_3B_4O_9 \cdot 5H_2O$, $Zn[B_3O_3(OH)_5] \cdot H_2O$, $Zn_2B_6O_{11}$, $Zn_4B_2O_7 \cdot H_2O$, $Zn_2B_6O_{11} \cdot 3.5H_2O$ and $ZnB_4O_7 \cdot 4H_2O$. The inorganic boron compounds may be used singly or as mixtures.

Particularly preferred are those inorganic boron compounds which at temperatures of 200 to 1000° C., in particular 300 to 600° C., eliminate water that is bound in the form of water of crystallization. Quite particularly preferred is zinc borate hydrate (e.g. $Zn_4B_2O_7 \cdot H_2O$, $Zn_2B_6O_{11} \cdot 3.5H_2O$ and $ZnB_4O_7 \cdot 4H_2O$), in particular $Zn_2B_6O_{11} \cdot 3.5H_2O$.

The mean particle diameter of the inorganic boron compound is 1 nm to 20 μm, preferably 0.1 μm to 15 μm, and particularly preferably 0.5 μm-12 μm.

The terms 'particle size' and 'particle diameter' always signify the mean particle diameter $d_{50}$, ascertained by ultracentrifuge measurements according to W. Scholtan et al., *Kolloid-Z. und Z. Polymere* 250 (1972), pp 782 to 796.

Anti-Dripping Agents F

The compositions according to the invention may include fluorinated polyolefins F as anti-dripping agents. Fluorinated polyolefins are known (cf., for example, EP-A 640 655). An example of a commercial product is Teflon® 30 N produced by DuPont.

The fluorinated polyolefins may also be used in the form of a coagulated mixture of emulsions of the fluorinated polyolefins with emulsions of the graft polymers B) or with an emulsion of a copolymer G.1) preferably based on styrene/acrylonitrile, the fluorinated polyolefin being mixed as emulsion with an emulsion of the graft polymer or copolymer and the mixture coagulated.

Furthermore, the fluorinated polyolefins may be used as a pre-compound with the graft polymer B) or with a copolymer G.1) preferably based on styrene/acrylonitrile. The fluorinated polyolefins are mixed as powder with a powder or granulate of the graft polymer or copolymer and are compounded in the melt generally at temperatures of 200° C. to 330° C. in conventional units such as internal mixers, extruders or double-shaft screws.

The fluorinated polyolefins may also be employed in the form of a master batch that is produced by emulsion polymerization of at least one monoethylenically unsaturated monomer in the presence of an aqueous dispersion of the fluorinated polyolefin. Preferred monomer components are styrene, acrylonitrile and mixtures thereof. The polymer is employed as a free-flowing powder after acidic precipitation and subsequent drying.

The coagulates, pre-compounds or master batches ordinarily have solids contents of fluorinated polyolefin from 5 wt. % to 95 wt. %, preferably 7 wt. % to 60 wt. %.

Component G

The composition according to the invention may include as further component G one or more thermoplastic vinyl (co)polymers G.1 and/or polyalkylene terephthalates G.2 in quantities of 0-1.5 parts by weight, preferably 0-1 parts by weight. In particularly preferred manner the composition is free from thermoplastic vinyl (co)polymers G.1 and polyalkylene terephthalates G.2. Suitable as vinyl (co)polymers G.1 are polymers of at least one monomer from the group comprising the vinyl aromatics, vinyl cyamides (unsaturated nitriles), ($C_1$-$C_8$)-alkyl(meth)acrylates, unsaturated carboxylic acids and also derivatives (such as anhydrides and imides) of unsaturated carboxylic acids. Particularly suitable are (co)polymers formed from G.1.1 50 parts by weight to 99 parts by weight, preferably 60 parts by weight to 80 parts by weight, of vinyl aromatics and/or ring-substituted vinyl aromatics such as styrene, α-methylstyrene, p-methylstyrene, p-chlorostyrene and/or ($C_1$-$C_8$)-alkyl methacrylates such as methyl methacrylate, ethyl methacrylate, and G.1.2 1 part by weight to 50 parts by weight, preferably 20 parts by weight to 40 parts by weight, of vinyl cyanides (unsaturated nitriles) such as acrylonitrile and methacrylonitrile and/or ($C_1$-$C_8$)-alkyl (meth)acrylates, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenyl maleimide.

The vinyl (co)polymers G.1 are resinous, thermoplastic and rubber-free. In particularly preferred manner the copolymer is formed from G.1.1 styrene and G.1.2 acrylonitrile.

The (co)polymers according to G.1 are known and may be produced by radical polymerization, in particular by emulsion polymerisation, suspension polymerization, solution polymerization or bulk polymerization. The (co)polymers preferably have average molecular weights Mw (weight-average, ascertained by light scattering or sedimentation) between 15,000 and 200,000.

The polyethylene terephthalates of component G.2 are reaction products formed from aromatic dicarboxylic acids or their reactive derivatives, such as dimethyl esters or anhydrides, and aliphatic, cycloaliphatic or araliphatic diols, as well as mixtures of these reaction products.

Preferred polyalkylene terephthalates include at least 80 wt. %, preferably at least 90 wt. %, relative to the dicarboxylic-acid component, terephthalic-acid residues at least 80 wt. %, preferably at least 90 mol. %, relative to the diol component, ethylene-glycol residues and/or butanediol-1,4 residues.

The preferred polyalkylene terephthalates may include, in addition to terephthalic-acid residues, up to 20 mol. %, preferentially up to 10 mol. %, residues of other aromatic or cycloaliphatic dicarboxylic acids with 8 to 14 C atoms, or of aliphatic dicarboxylic acids with 4 to 12 C atoms, such as, for example, residues of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may include, in addition to ethylene-glycol residues or butanediol-1,4 residues, up to 20 mol. %, preferentially up to 10 mol. %, other aliphatic diols with 3 to 12 C atoms or cycloaliphatic diols with 6 to 21 C atoms, for example residues of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-β-hydroxyethoxyphenyl)-propane and 2,2-bis(4-hydroxypropoxyphenyl)propane (DE-A-2 407 674, DE-A-2 407 776, DE-A-2 715 932).

The polyalkylene terephthalates may be branched by incorporation of relatively small quantities of trihydric or tetrahydric alcohols or of tribasic or tetrabasic carboxylic acids, for example according to DE-A 1 900 270 and U.S. Pat. No. 3,692,744. Examples of preferred branching agents are trimesic acid, trimellitic acid, trimethylolethane, trimethylolpropane and pentaerythritol.

Particularly preferred are polyalkylene terephthalates that have been produced solely from terephthalic acid and the reactive derivatives thereof (e.g. the dialkyl esters thereof) and ethylene glycol and/or butanediol-1,4, and mixtures of these polyalkylene terephthalates.

Mixtures of polyalkylene terephthalates contain 1 wt. % to 50 wt. %, preferably 1 wt. % to 30 wt. %, polyalkylene terephthalate and 50 wt. % to 99 wt. %, preferably 70 wt. % to 99 wt. %, polybutylene terephthalate.

The polyalkylene terephthalates that are preferably used generally have an intrinsic viscosity from 0.4 dl/g to 1.5 dl/g, preferably 0.5 dl/g to 1.2 dl/g, measured in phenol/o-dichlorobenzene (1:1 parts by weight) at 25° C. in an Ubbelohde viscometer.

The polyalkylene terephthalates may be produced by known methods (see, for example, *Kunststoff-Handbuch*, Volume VIII, p 695 ff., Carl-Hanser-Verlag, Munich 1973).

Further Added Substances H

The molding compositions according to the invention may contain one or more conventional additives, such as, lubricants, mold-release agents, nucleating agents, antistatic agents, stabilizers, dyestuffs and pigments, fillers and reinforcing materials different from talc and from component E.

Component H also includes extremely fine-particle inorganic compounds that are distinguished by an average particle diameter less than or equal to 200 nm, preferably less than or equal to 150 nm, in particular 1 nm to 100 nm.

Suitable extremely fine-particle inorganic compounds preferably include at least one polar compound of one or more metals of the 1st to 5th Main Groups or 1 st to 8th Subgroups of the Periodic Table, preferably of the 2nd to 5th Main Groups or 4th to 8th Subgroups, particularly preferably of the 3rd to 5th Main Groups or 4th to 8th Subgroups, or of compounds of these metals with at least one element selected from oxygen, hydrogen, sulfur, phosphorus, boron, carbon, nitrogen or silicon. Preferred compounds are, for example, oxides, hydroxides, hydrous oxides, sulfates, sulfites, sulfides, carbonates, carbides, nitrates, nitrites, nitrides, borates, silicates, phosphates, hydrides, phosphites or phosphonates.

The extremely fine-particle inorganic compounds preferably consist of oxides, phosphates, hydroxides, preferentially of $TiO_2$, $SiO_2$, $SnO_2$, $ZnO$, $ZnS$, boehmite, $ZrO_2$, $Al_2O_3$, aluminium phosphates, iron oxides, furthermore TiN, WC, AlO(OH), $Fe_2O_3$ iron oxides, $Na_2SO_4$, vanadium oxides, zinc borate, silicates such as Al silicate, Mg silicate, one-dimensional, two-dimensional, three-dimensional silicates. Mixtures and doped compounds may also be used. Furthermore, these extremely fine-particle inorganic compounds may be surface-modified with organic molecules, in order to achieve better compatibility with the polymers. It is possible for hydrophobic or hydrophilic surfaces to be generated in this manner.

Particularly preferred are hydrated aluminium oxides (e.g. boehmite) or $TiO_2$.

The terms 'particle size' and 'particle diameter' always signify the mean particle size ($d_{50}$ value), ascertained by ultracentrifuge measurements according to W. Scholtan et al., *Kolloid-Z. und Z Polymere* 250 (1972), pp 782-796).

The inorganic compounds may be present in the form of powders, pastes, sols, dispersions or suspensions. Powders may be obtained from dispersions, sols or suspensions by precipitation.

The extremely fine-particle inorganic compounds may be worked into the thermoplastic molding compositions by conventional processes, for example by direct kneading or extruding of molding compositions and the extremely fine-particle inorganic compounds. Preferred processes are constituted by the production of a master batch, for example in flameproofing additives, and of at least one component of the molding compositions according to the invention in monomers or solvents, or the co-precipitation of a thermoplastic component and the extremely fine-particle inorganic compounds, for example by co-precipitation of an aqueous emulsion and the extremely fine-particle inorganic compounds, optionally in the form of dispersions, suspensions, pastes or sols of the extremely fine-particle inorganic materials.

The compositions are produced by mixing the respective constituents in known manner and melt-compounding and melt-extruding at temperatures from 200° C. to 300° C. in conventional units such as internal mixers, extruders and double-shaft screws.

Mixing of the individual constituents may be undertaken in known manner both successively and simultaneously, to be specific both at about 20° C. (room temperature) and at higher temperature.

The thermoplastic molding compositions are suitable, because of their excellent flame resistance and their high thermal stability, for producing molded articles of any type. By reason of the thermal stability and rheological properties, processing temperatures of over 240° C. are preferred.

The invention also provides processes for producing the molding compositions, and the use of the molding compositions for producing molded articles.

The molding compositions may be processed into molded articles by injection molding, or the molding compositions may preferably be extruded into sheets or films, particularly preferably into sheets.

The invention further provides the production of molded articles from previously produced sheets or films by thermoforming.

Thermoforming processes are described, for example, by G. Burkhardt et al. ("Plastics, Processing", in *Ullmann's Encyclopedia of Industrial Chemistry*, Wiley-VCH Verlag GmbH & Co. KgaA, 2002), or in the *Römpp Lexikon Chemie*, Georg Thieme Verlag Stuttgart, 1999. Thermoforming processes generally describe procedures in which semifinished plastic products are heated and are shaped into three-dimensional objects under the influence of external forces (heat, pressure or vacuum).

Whereas, in the case of drawing (hot forming), a preheated plastic sheet is inserted between the two parts of the tool, the positive and the negative, and these parts are then pressed together, as a result of which the plastic part is given its shape, draw forming operates with spring-loaded hold-down devices. The procedure without a negative tool is designated as deep drawing; deformation by means of a vacuum (vacuum forming) is also possible.

The extruded planar molded articles described herein can be processed, for example, in the deep drawing process at surface temperatures from 150° C. to 220° C., in particularly preferred manner at surface temperatures from 160° C. to 215° C.

The invention consequently also provides a process for producing the thermoformed molded articles according to the invention, wherein
(i) in a first step the components of the polycarbonate composition are melted and mixed,
(ii) in a second step the resulting melt is cooled and granulated,
(iii) in a third step the granulate is melted and is extruded into sheets, and
(iv) in a fourth step the sheets are shaped into a three-dimensional article, preferably by means of hot forming, draw forming, deep drawing or vacuum forming under the influence of external forces, for example by means of a one-part or two-part tool and/or by means of vacuum, particular preferably the three-dimensional object is shaped by means of deep drawing, preferably at surface temperatures of the sheets from 150° C. to 220° C., in particularly preferred manner at surface temperatures of the sheets from 160° C. to 215° C.

The molded articles are suitable for the following applications: vehicle parts or interior finishing parts for cars, buses, lorries, motor caravans, rail vehicles, aircraft, ships or other vehicles, cover plates for the construction industry, planar wall elements, partition walls, wall-protection strips, edge-protection strips, profiles for electrical-installation channels, cable conductors, conductor-rail covers, window and door profiles, furniture parts and traffic signs. The molded articles are particularly suitable for the following applications: vehicle parts or interior finishing parts for cars, buses, lorries, motor caravans, rail vehicles and aircraft.

The molded articles are suitable in particularly preferred manner for producing covers, ceiling linings and side panellings, luggage flaps and similar interior panellings for rail vehicles and aircraft.

The following Examples serve for further elucidation of the invention.

EXAMPLES

Component A1

Branched polycarbonate based on bisphenol A (relative solution viscosity of $\eta_{rel}=1.34$, measured in $CH_2Cl_2$ as solvent at 25° C. and at a concentration of 0.5 g/100 ml) branched by the incorporation of 0.3 mol. % isatin biscresol, relative to the sum of bisphenol A and isatin biscresol.

Component B1

Impact modifier, methyl-methacrylate-modified silicone-acrylate rubber, Metablen® SX 005, available from Mitsubishi Rayon Co. Ltd., CAS 143106-82-5.

Component B2

Impact modifier, styrene-acrylonitrile-modified silicone-acrylate rubber, Metablen® SRK 200 available from Mitsubishi Rayon Co. Ltd., CAS 178462-89-0.

Component C1

Talc, Luzenac® A3C produced by Luzenac Naintsch Mineralwerke GmbH with an MgO content of 32 wt. %, an $SiO_2$ content of 61 wt. % and an $Al_2O_3$ content of 0.3 wt. %.

Component D

Bisphenol-A-Based Oligophosphate

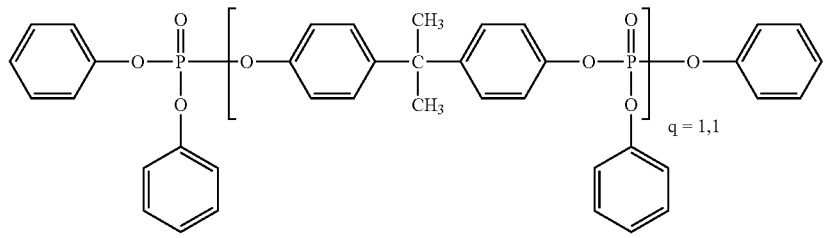

Component E

Zinc borate hydrate ($Zn_2B_6O_{11} \cdot 3.5H_2O$, CAS No. 138265-88-0).

Component F

Polytetrafluoroethylene powder, CFP 6000 N, DuPont.

Component H

Mixture of 0.2 parts by weight of pentaerythritol tetrastearate as mold-release agent and 0.1 parts by weight of phosphite stabilizer, Irganox® B 900, Ciba Specialty Chemicals.

Production and Testing of the Molding Compositions

In a twin-screw extruder (ZSK-25) (Werner und Pfleiderer) the materials listed in Table 1 are compounded and granulated at a rotary speed of 225 rpm and with a throughput of 20 kg/h at a machine temperature of 260° C.

The granulates are processed in an injection-molding machine into the appropriate test specimens (stock temperature 260° C., tool temperature 80° C., flow-front velocity 240 mm/s). Characterization is undertaken in accordance with DIN EN ISO 180/1A (Izod notched impact strength; sample size 80×10×4 $mm^3$), DIN EN ISO 527 (tensile modulus of elasticity), DIN ISO 306 (Vicat softening temperature, process B with 50 N loading and with a heating-rate of 120 K/h), ISO 11443 (melt viscosity), DIN EN ISO 1133 (melt volume-flow rate MVR) and UL94V.

In addition, sheets with a thickness of 3 mm were extruded (degassing extruder Breyer 60 without pre-drying of granulate, three-roll smoothing mill, two-roll take-off, radiometric thickness measurement) at a melt temperature of 270° C. in a sheet-and-film plant produced by Breyer, Singen.

The appropriate test-specimen geometries for ASTM E 162 and ASTM E 662 were cut out of the extruded sheets. Determination of the flame-spread index (Is) and of the dripping behavior is undertaken in accordance with ASTM E 162

(with aluminium backing, d=3 mm). Determination of the smoke density is undertaken in accordance with ASTM E 662 (with igniting flame, d=3 mm).

The requirements placed on materials for American rail vehicles are laid down in the so-called Docket 90-A (Recommended Fire Safety Practices for Transit Bus and Van Materials Selection—published by the Department of Transportation, Federal Transit Administration, Federal Register, Vol. 58, No. 201). Accordingly, materials for interior panellings in ASTM E 162 must not display any burning dripping and must have a flame-spread index Is of less than 35; in addition, according to ASTM E 662 they must have a low smoke density (Ds 1.5 min<100 and Ds 4 min<200).

The suitability for thermoforming may be demonstrated by producing so-called thermoformed pyramids, the extruded sheets being thermoformed at 200° C. to a depth of 20 cm into a stepped pyramid with six elements. The surface quality of the thermoformed pyramids is assessed visually. The assessment "good" means that no edge cracks and no stress whitenings occur at the corners. The assessment "poor" means that edge cracks and/or stress whitenings occur at the edges.

From Table 1 it is evident that only the compositions of Examples 3-6—with the combination of branched polycarbonate, silicone impact modifier, BDP, talc and zinc borate hydrate—achieve the object according to the invention and satisfy the requirements according to the American regulation for rail vehicles (Docket 90-A), i.e. according to ASTM E 162 have a flame-spread index Is of less than 35, exhibit no burning dripping in the course of the test according to ASTM E 162, and satisfy the requirements with respect to smoke density according to ASTM E 662 (Ds 1.5 min<100 and Ds 4 min<200). In addition, the tensile modulus of elasticity in Examples 3-6 according to the invention is clearly above 3500 N/mm². The Comparative Examples V1 and V2, on the other hand, do not satisfy at least one of the aforementioned requirements Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic composition comprising
   A) 40-95 parts by weight of branched aromatic polycarbonate and/or aromatic poly(ester)carbonate,
   B) 1-25 parts by weight of a graft polymer including at least one graft base selected from the group consisting of silicone rubber and silicone-acrylate rubber,
   C) 9-18 parts by weight of talc,
   D) 0.4-20 parts by weight of phosphorus-containing flameproofing agent,
   E) 1-6 parts by weight of at least one inorganic boron compound selected from the group consisting of $Zn_4B_2O_7 \cdot H_2O$, $Zn_2B_6O_{11} \cdot 3.5H_2O$ and $ZnB_4O_7 \cdot 4H_2O$, and
   F) 0-3 parts by weight of an anti-dripping agent.

2. The composition according to claim 1, wherein the branched poly(ester)carbonate contains residues of at least one amine functionality.

3. The composition according to claim 1 wherein the graft polymer (B) is synthesised from
   B.1 5 wt. % to 95 wt. % of one or more vinyl monomers on
   B.2 95 wt. % to 5 wt. % of one or more graft bases exhibiting a glass transition temperature <10° C. selected from the group consisting of silicone rubber and silicone-acrylate rubber.

4. The composition according to claim 1 wherein the phosphorus-containing flameproofing agent conforms to formula (VIII)

TABLE 1

Composition and Properties of the Molding Compositions

| | | V1 | V2 | 3 | 4 | 5 | 6 |
|---|---|---|---|---|---|---|---|
| Components (wt. %) | | | | | | | |
| A1 | | 74.5 | 77.6 | 72.6 | 70.6 | 72.6 | 70.5 |
| B1 | | 4.7 | 4.7 | 4.7 | 4.7 | | |
| B2 | | | | | | 4.7 | 4.7 |
| C1 | | 10 | | 10 | 10 | 10 | 10 |
| D | | 10.1 | 13 | 10 | 10 | 10 | 10.1 |
| E | | | 4 | 2 | 4 | 2 | 4 |
| F | | 0.4 | 0.4 | 0.4 | 0.4 | 0.4 | 0.4 |
| H | | 0.3 | 0.3 | 0.3 | 0.3 | 0.3 | 0.3 |
| Properties | | | | | | | |
| Izod notched impact strength/RT (DIN EN ISO 180/1A) | kJ/m² | 13.8 | 10.6 | 10.4 | 9.9 | 8.0 | 7.6 |
| Tensile modulus of elasticity (DIN EN ISO 527) | N/mm² | 3813 | 2664 | 3784 | 3871 | 4076 | 4082 |
| Vicat B 120 (DIN ISO 306) | ° C. | 112 | 104 | 110 | 110 | 111 | 111 |
| Melt viscosity (260° C.) [100 s⁻¹] (ISO 11443) | Pa · s | 1161 | 653 | 914 | 992 | 881 | 1001 |
| Melt viscosity (260° C.) [1000 s⁻¹] (ISO 11443) | Pa · s | 406 | 291 | 349 | 377 | 345 | 372 |
| Melt viscosity (260° C.) [1500 s⁻¹] (ISO 11443) | Pa · s | 315 | 236 | 274 | 293 | 274 | 289 |
| MVR 260° C./5 kg (DIN EN ISO 1133) | cm³/10 min | 7.5 | 18.8 | 9.8 | 9 | 11.0 | 9.3 |
| UL 94 V (d = 1.5 mm); classification | | V0 | V0 | V0 | V0 | V0 | V0 |
| UL 94 V (d = 1.5 mm); total after-burning time | s | 10 | 19 | 10 | 8 | 5 | 7 |
| Flame-spread index Is (ASTM E 162 (d = 3 mm)) | | 11 | 28 | 6 | 7 | 0 | 5 |
| Burning dripping? (ASTM E 162 (d = 3 mm)) | yes/no | yes | yes | no | no | no | no |
| Smoke density Ds after 1.5 min (ASTM E 662 (d = 3 mm)) | | n.d. | 9 | 2 | 2 | 2 | 2 |
| Smoke density Ds after 4 min (ASTM E 662 (d = 3 mm)) | | n.d. | 143 | 68 | 69 | 100 | 79 |
| Test acc. to Docket 90-A (d = 3 mm) passed? | yes/no | no | no | yes | yes | yes | yes |
| Visual assessment of the thermoformed pyramids | good/poor | n.d. | n.d. | good | good | good | good | n.d. = not determined

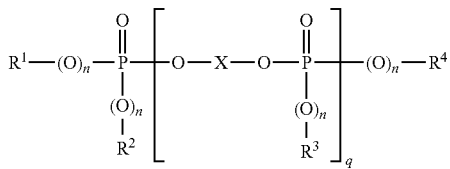

in which

R$^1$, R$^2$, R$^3$ and R$^4$ independently of one another denote C$_1$ to C$_8$ alkyl, C$_5$ to C$_6$ cycloalkyl, C$_6$ to C$_{20}$ aryl or C$_7$ to C$_{12}$ aralkyl, n independently of one another denote 0 or 1, q is 0 to 30 and X is a residue of an aromatic compound having 6 to 30 C atoms, or of a linear or branched aliphatic compound having 2 to 30 C atoms.

5. The composition according to claim 4, wherein X is the residue of bisphenol A.

6. The composition according to claim 1 wherein said graft polymer is present in amount of 4.7 to 6.6 parts by weight.

7. The composition according to claim 1 wherein said talc is present in an amount of 10 to 12 parts by weight.

8. The composition according to claim 1 wherein the mean particle size of the talc is 1.1 μm to 5 μm.

9. The composition according to claim 1 wherefrom thermoplastic vinyl (co)polymers and polyalkylene terephthalates are absent.

10. The composition according to claim 1 further containing at least one member selected from the group consisting of lubricant, mold-release agent, nucleating agent, antistatic agent, stabilizer, dyestuff, pigment, filler, and reinforcing material different from talc.

11. The composition according to claim 1 further containing at least one inorganic compound with an average particle diameter of less than or equal to 200 nm.

12. An article of manufacture comprising the composition of claim 1.

13. The composition according to claim 1, wherein the inorganic boron compound is present in 2-4 parts by weight.

14. The composition according to claim 1, wherein the inorganic boron compound is Zn$_2$B$_6$O$_{11}$·3.5H$_2$O.

15. The composition according to claim 13, wherein the inorganic boron compound is Zn$_2$B$_6$O$_{11}$·3.5H$_2$O.

* * * * *